Figure 1:
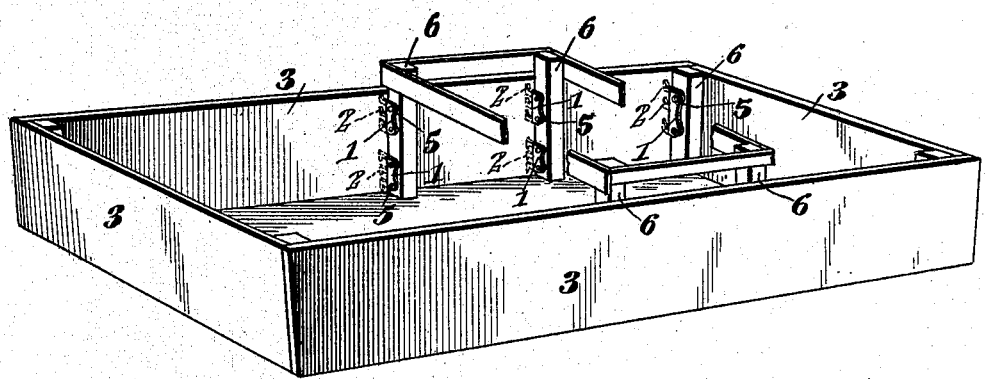

No. 885,744. PATENTED APR. 28, 1908.
N. GILBERT.
CARRIAGE BODY.
APPLICATION FILED JAN. 29, 1907.

Nelson Gilbert, Inventor

Witnesses
Jas. F. McCathran
H. H. Riley.

By E. G. Siggers
Attorney

UNITED STATES PATENT OFFICE.

NELSON GILBERT, OF ALEXANDRIA, ONTARIO, CANADA.

CARRIAGE-BODY.

No. 885,744.  Specification of Letters Patent.  Patented April 28, 1908.

Application filed January 29, 1907. Serial No. 354,766.

*To all whom it may concern:*

Be it known that I, NELSON GILBERT, a subject of the King of Great Britain, residing at Alexandria, in the Province of Ontario and Dominion of Canada, have invented a new and useful Carriage-Body, of which the following is a specification.

The invention relates to improvements in carriage bodies, more especially the means for securing the panels of a body to the frame thereof.

It is largely the practice in the construction of carriages to secure the panels of a carriage body to the posts, or other frame-work by means of screws let into the outer faces of the panels, and plugs of wood have been employed to fill the outer portions of the screw holes and conceal the heads of the screws to enable the panels to present smooth outer surfaces. But these plugs are not only discernible through the paint and varnish of the body, when the vehicle is finished, but they often work out in a comparatively short time and further mar the appearance or finish of the carriage.

Heretofore various devices have been devised for enabling the panels of a carriage, or analogous vehicle to be secured to the frame without employing screws, or similar fastening devices, but owing to the expense, inconvenience, and other objections, such devices have not found favor with carriage manufacturers, and have not supplanted the screws and objectionable plugs, above referred to, in the construction of carriages.

The present invention has for its object to provide a simple, inexpensive and efficient device of great strength and durability, adapted to enable panels to be secured to the frame of a body of a vehicle, without piercing them with screws, or analogous devices and without employing the objectionable plugs, heretofore used for concealing the heads of such fastening devices.

A further object of the invention is to provide a device of this character, which will not affect the outer face of the panel, and which will securely fasten the same to the frame of the body of a vehicle, without weakening the panel.

The invention also has for its object to provide a panel fastener, which may be readily removed from a panel and the framework of the body of a vehicle, to permit the panel to be easily detached.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 2:
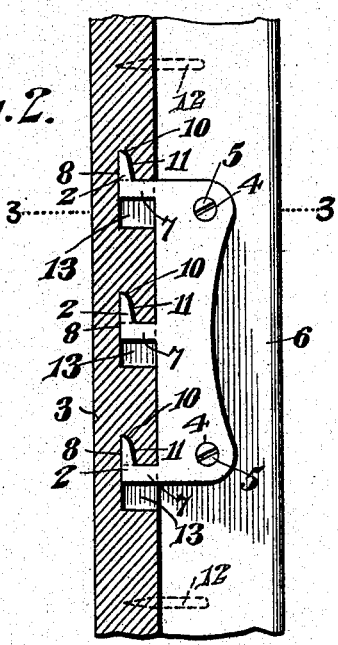
Figure 3:
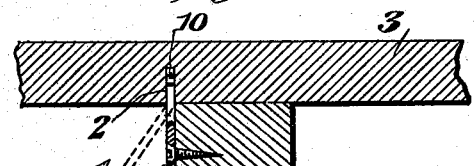
Figure 4:
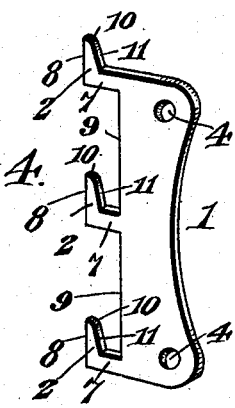

In the drawing:—Figure 1 is a perspective view of a vehicle body provided with panel fasteners, constructed in accordance with this invention. Fig. 2 is an enlarged detail vertical sectional view, showing one of the panel fasteners and illustrating the manner of securing a panel to a post. Fig. 3 is a horizontal sectional view, taken substantially on the line 3—3 of Fig. 2. Fig. 4 is a detail perspective view of one of the panel fasteners Like numerals of reference designate corresponding parts in all the figures of the drawing.

1 designates a panel fastener, constructed of steel, or other suitable material, and consisting of a thin plate or body and a plurality of substantially hook-shaped panel engaging devices 2, extending from one of the side edges of the plate or body, and adapted to engage a panel 3 of a vehicle body, as clearly illustrated in Fig. 2 of the drawing. The plate or body is provided with a plurality of perforations 4 for the reception of screws 5, or other suitable fastening devices for securing the said plate or body to the side face of a post 6, or other portion of the framework of a vehicle.

The hook-shaped engaging devices 2 consist of shanks 7 and bills or terminal portions, extending in the same direction and adapted to be simultaneously driven into engagement with the panel 3, by hammering upon one end of the fastener, or otherwise driving the same. The shanks 7 extend from the plate or body, and are arranged at right angles to the length of the same, while the bills or terminal portions are disposed longitudinally of the said plate or body. The outer edges 8 of the bills of the panel engaging devices 2 are straight and alined, and are disposed in parallelism with the proximate side edge 9 of the body. The side edge 9 of the plate or body is straight, and is adapted to fit against the inner face of the panel 3.

The inner edge of each bill is rounded or curved slightly at the point at 10, and continues straight therefrom to the shank 7. This straight angularly disposed portion 11 of the inner edge of the bill is inclined, or angularly disposed, and is adapted, when the bill is driven into the wood of the panel, to draw the hook-shaped engaging portion into the wood, and bring the straight edge 9 of the plate or body tightly against the inner face of the panel.

Preparatory to applying the fastener to the panel and the post, the panel is glued to the frame, and double pointed wire nails 12 are preferably employed, and are arranged, as indicated in dotted lines in Fig. 2 of the drawing. The double pointed wire nails, which project from the post 6, prior to the attachment of the panel, are partially embedded in the same, when the panel is placed in position.

Short spaced mortises or recesses 13 are cut, or otherwise formed in the inner face of the panel at intervals to correspond to the hook-shaped engaging portions of the fastener by means of a suitable tool, and the said hook-shaped engaging portions are inserted in the mortises or recesses, and the fastener is driven longitudinally to embed the bills of the hook-shaped portions in the wood of the panel. To facilitate driving the hook-shaped portions in the wood of the panel, the plate or body of the fastener may be flexed, or bent outward from the post 6 to a point between the same and the panel, as indicated in dotted lines in Fig. 3 of the drawing, to enable the fastener to be easily struck with a hammer, or other tool, and after the hook-shaped projections have been properly driven into the walls of the recesses or mortises of the panel, the plate or body portion is secured flat against the post 6. The driving end of the plate is provided with a straight transverse edge to receive a driving tool or the blows of a hammer, whereby the bills of the hooks may be readily driven into the walls of the short mortises or recesses. The hook-shaped portions 2 engage the panel at different points and firmly and securely clamp the panel to the post, and owing to the spacing of the hook-shaped portions, the panel is not weakened by a long slot or recess and the inner edge of the plate fits against and firmly engages the panel between the recesses or mortises. It will also be seen that the outer face of the panel is not pierced, or otherwise marred in securing it to the frame of the body.

Although the fasteners are shown applied in Fig. 1 to the body of a buggy, yet it will be readily apparent that the fastener is applicable to all kinds of vehicles and analogous structures, where it is desirable to secure two members together without marring the outer face of one of the members, and in applying the fastening devices to the panels of a vehicle, they may be reversely arranged, as illustrated in Fig. 1, in which the bills of the upper fasteners extend upward and those of the lower fasteners extend downward to facilitate driving the fasteners into engagement with the panels.

Having thus fully described my invention, what I claim as new and desire to secure by Letters Patents, is:—

1. In a vehicle body, the combination with a frame member, and a panel provided at its inner face with a plurality of short spaced mortises or recesses, of a fastener consisting of a plate bearing flat against the outside of the frame member and provided at its inner edge with a plurality of hook-shaped engaging portions extending into the said recesses and having bills disposed longitudinally of the fastener and embedded in the walls of the mortises or recesses and adapted to be simultaneously driven into the same by driving the plate longitudinally, said plate having its inner edge bearing against and firmly engaging the panel between the recesses or mortises.

2. In a vehicle body, the combination with a frame member, and a panel provided at its inner face with a plurality of short spaced mortises or recesses, of a fastener comprising a plate bearing flat against the outside of the frame member and having a driving end and provided with a plurality of hook-shaped engaging portions extending into the mortises or recesses and consisting of straight transverse shanks, and longitudinally disposed bills embedded in the walls of the mortises or recesses and extending in the same direction to enable them to be simultaneously driven into the panel and having their inner edges arranged at an angle to the plate and adapted to draw the same and the inner edge of the plate firmly into engagement with the inner face of the panel between the mortises or recesses, and fastening means piercing the plate and securing the same to the frame member for permanently connecting the panel to the latter.

3. A panel fastener for securing the panel of a vehicle body to the frame member thereof comprising a plate having a driving end and provided at its inner longitudinal edge with a plurality of hook-shaped portions, one extending inwardly from the driving end of the plate, another extending outwardly from the other end of the plate, and an intermediate hook-shaped portion located at a point between the ends of the plate, said hook-shaped portions consisting of straight transverse shanks and longitudinal bills extending in the opposite direction from the driving end of the plate and provided with straight alined outer edges to enable them to be driven in straight and having their inner edges arranged at an angle to the plate for drawing the latter tightly against the inner face of the panel.

In testimony, that I claim the foregoing as my own, I have hereto affixed my signature in the presence of two witnesses.

NELSON GILBERT.

Witnesses:
ALEX. L. SMITH,
ROSABELLE SMITH.